United States Patent [19]

Otoguro et al.

[11] Patent Number: 4,463,061
[45] Date of Patent: Jul. 31, 1984

[54] BOILER TUBE HAVING IMPROVED HIGH TEMPERATURE MECHANICAL STRENGTH, IMPROVED HIGH TEMPERATURE CORROSION RESISTANT PROPERTY AND RESISTANCE TO EMBRITTLEMENT DURING SERVICE

[75] Inventors: Yasuo Otoguro; Mikio Yamanaka; Katukuni Hashimoto, all of Sagamihara; Mizuo Sakakibara, Kawasaki; Masao Onoyama, Hikari, all of Japan

[73] Assignee: Nippon Steel Corporation, Tokyo, Japan

[21] Appl. No.: 502,836

[22] Filed: Jun. 9, 1983

[30] Foreign Application Priority Data

Jun. 11, 1982 [JP] Japan ............................ 57-99388

[51] Int. Cl.$^3$ ............................................ B32B 27/06
[52] U.S. Cl. .................................. 428/683; 428/595; 428/678; 165/180; 138/143
[58] Field of Search ................ 428/683, 595, 678; 165/180, 134 R, DIG. 8, DIG. 9; 122/DIG. 13; 138/197, 143, DIG. 6

[56] References Cited

U.S. PATENT DOCUMENTS

| | | | |
|---|---|---|---|
| 3,694,271 | 6/1971 | Egnell | 428/683 |
| 3,969,153 | 7/1976 | Suzuki et al. | 122/DIG. 13 |
| 4,075,376 | 2/1978 | Jaeger | 165/180 |

OTHER PUBLICATIONS

"Co-Extruded Tubes Improve Resistance to Fuel Ash Corrosion in U.K. Utility Boilers", described by T. Flatly et al., Material Performance, vol. 20, No. 5, 5-81.

Primary Examiner—L. Dewayne Rutledge
Assistant Examiner—Debbie Yee
Attorney, Agent, or Firm—Pollock, Vande Sande & Priddy

[57] ABSTRACT

A boiler tube having improved high temperature strength, improved high temperature corrosion resistance, and resistivity to embrittlement during the service thereof, comprising an outer surface layer and an inner part, the outer surface layer consisting essentially, by weight, of 0.03-0.20% carbon, 1.5-4.0% silicon, 0.1-3.0% manganese, 13-25% chromium, 13-40% nickel, 0.5-3.0% at least one kind selected from the group consisting of molybdenum and tungsten, 0.05-0.5% at least one kind selected from the group consisting of titanium, niobium and vanadium, and the balance iron and inevitable impurities, the inner part consisting essentially, by weight, of 0.03-0.20% carbon, 0.3-1.0% silicon, 0.1-3.0% manganese, 13-25% chromium, 13-40% nickel, 0.5-3.0% at least one kind selected from the group consisting of molybdenum and tungsten, 0.05-0.5% at least one kind selected from the group consisting of titanium, niobium and vanadium, and the balance iron and inevitable impurities. Boron of 0.001-0.01% may be further added to the alloy to improve creep strength while keeping improved high temperature corrosion resistance.

16 Claims, No Drawings

BOILER TUBE HAVING IMPROVED HIGH TEMPERATURE MECHANICAL STRENGTH, IMPROVED HIGH TEMPERATURE CORROSION RESISTANT PROPERTY AND RESISTANCE TO EMBRITTLEMENT DURING SERVICE

The present invention relates to an austenitic stainless steel boiler tube simultaneously improved in such properties as resistance to embrittlement during the service thereof, creep resistance and high-temperature corrosion resistance.

With a steep rise in the price of oil, recently, coal has positively been utilized. In the thermal-power generation in Japan, also, it is assumed that the conventional heavy oil burning system will soon shift to the coal burning system. It is said that the transfer from heavy oil to coal will bring the corrosive environment in a boiler into a more severe state. Therefore, how to cope with the corrosion of boiler tubes will be an important technical subject.

On the other hand, it has also been known that the raising of operation temperature is effective in improving the efficiency of conversion from thermal energy to electrical energy, which is one of the essential countermeasures to save energy with respect to the exhaustion of energy resources and a sudden rise in prices thereof.

Such a rise in operating temperature causes the outer surface of a boiler tube to be exposed to a more intense corrosion environment. Therefore, it has been desired to develop a boiler tube improved to be more excellent in high-temperature corrosion resistance and creep strength than the conventional boiler tubes.

Although it is known that increasing the amount of Cr is effective in improving the high-temperature corrosion resistance, an increase in amount of Cr causes problems such as a decrease in creep strength due to lowering of the stability of austenite and reduction in toughness and strength due to generation of $\sigma$ phase. In order to prevent such problems from arising, it is necessary to add a large amount of Ni commensurate to the amount of Cr, which results in a higher cost.

To overcome the problem, it has been proposed to provide a composite boiler tube having a surface layer and an inner layer in which outer layer there is afforded an improved high temperature corrosion resistance, as shown in a prior art reference entitled "Co-Extruded Tubes Improve Resistance to Fuel Ash Corrosion in U.K. Utility Boilers" described by T. Flatly et al in "Material Performance Vol. 20 No. 5" dated May, 1981. However, the composite boiler tube of the reference is still insufficient in the points of high temperature corrosion resistance and creep strength in a case where the temperature of the outer surface layer of a boiler tube becomes about 700° C. or above.

The object of the present invention is to obtain a boiler tube having improved high temperature strength, improved high temperature corrosion resistance and resistance to embrittlement during the service thereof while depressing the increase of the cost of the boiler tube as little as possible.

The inventors of the present invention has discovered that silicon is very effective to improve the high temperature corrosion resistance of the outer surface layer of a boiler tube exposed to boiler combustion gas including various substances inducing high temperature corrosion. However, silicon exceeding a predetermined level in the austenitic stainless steel functions to cause the occurrence of $\sigma$ phase in the matrix which $\sigma$ phase causes the deterioration of the mechanical properties thereof. In taking these points into account, the boiler tube of the present invention is made to have an outer surface layer and an inner part, the outer surface layer consisting essentially, by weight, of 0.03–0.20% carbon, 1.5–4.0% silicon, 0.1–3.0% manganese, 13–25% chromium, 13–40% nickel, 0.5–3.0% at least one kind selected from the group consisting of molybdenum and tungsten, 0.05–0.5% at least one kind selected from the group consisting of titanium, niobium and vanadium, and the balance iron and inevitable impurities, the inner part consisting essentially, by weight, of 0.03–0.20% carbon, 0.3–1.0% silicon, 0.1–3.0% manganese, 13–25% chromium, 13–40% nickel, 0.5–30% at least one kind selected from the group consisting of molybdenum and tungsten, 0.05–0.5% at least one kind selected from the group consisting of titanium, niobium and vanadium, and the balance iron and inevitable impurities.

In the present invention boron of 0.001 to 0.01 weight percent may be added in the alloys of the boiler tube to further improve creep strength while keeping improved high temperature corrosion resistance.

The reasons why the chemical components in the present invention are limited at stated above will be explained.

Carbon is necessary for maintaining mechanical strength, however, the upper limit of the C content is selected to be 0.20 weight % from the viewpoint of weldability. More specifically, austenitic steels are liable to cause hot cracking during solidification of a weld metal, and particularly, C has a large adverse effect thereon. Therefore, the upper limit of the C content is held to be 0.20 weight %. On the other hand, the lower limit of the C content is selected to be 0.03 weight %, since a C content less than 0.03 weight % makes it difficult to ensure satisfactory creep rupture strength. In view of compatibility of mechanical strength and hot cracking resistance, the carbon content is preferably 0.05–0.15%.

Si is added as a deoxidizer and at the same time, as an element for improving oxidation resistance and high-temperature corrosion resistance.

Accordingly, in consideration of weldability and toughness, the upper limit of the Si content of the inner part of a boiler tube is selected to be 1.0 weight % so as to prevent deterioration to weldability and toughness from being caused. The lower limit of the Si content in the inner part is selected to be 0.3 weight % in order to perform deoxidation sufficiently and to obtain a good steel ingot.

The next item is the Si content of the outer surface layer of a boiler tube, which is the main point of the invention. It has been made clear by a high-temperature corrosion testing described later, that a Si content not smaller than 1.5 weight % increases the stability of a surface oxide film, so that the reaction thereof with a molten salt adhering to the outer surface of the boiler tube due to combustion gas is remarkably suppressed. On the other hand, an Si content exceeding 4 weight % substantially adversely affects workability; hence, the Si content of the outer surface layer is limited to fall between 1.5 and 4 weight %. In view of compatibility of corrosion resistance and workability, the Si content is preferably 1.8–3.0%.

In this case, the inventors have found that the high-temperature corrosion of a boiler tube in an actual boiler can be evaluated by such a way that a synthetic ash of 41 weight % Na$_2$SO$_4$+8 weight % V$_2$O$_5$+51 weight % Fe$_2$(SO$_4$)$_3$ is employed and heated to a service temperature of a boiler tube (650° to 750° C.) to melt, and a test piece of the boiler tube is immersed therein for 200 hours. The corrosion amount is desired to be not larger than 400 mg/cm$^2$ and preferably 176–396 mg/cm$^2$ in consideration of safety, and from this point of view, the thickness of the outer surface layer is determined in accordance with the Si content of the outer surface layer. More specifically, even when the Si amount is 4 weight %, if the thickness of an Si-enriched layer is less than 0.5 mm, the corrosion resistance is unsatisfactory; if the thickness exceeds 3 mm, the adverse effect thereof exerted on the quality of the whole boiler tube cannot be neglected. Therefore, the thickness of the outer surface layer is limited to fall between 0.5 and 3 mm.

Mn is necessary for not only deoxidation but also maintaining mechanical strength. The upper limit of the Mn content is selected to be 3.0 weight %, since addition of Mn in an amount exceeding 3.0 weight % saturates the effect offered thereby. On the other hand, the lower limit is selected to be 0.1 weight % in order to perform deoxidation and obtain a good steel quality. Preferably, the Mn content is 0.3–1.5%.

Cr is essential for obtaining oxidation resistance and high-temperature corrosion resistance, and hence always contained in heat resisting steel alloys. A Cr content less than 13 weight % is insufficient for obtaining the corrosion resistance. On the other hand, a Cr content exceeding 25 weight % lowers the stability of austenite, deteriorating the high-temperature strength, as well as promotes generation of $\sigma$ phase which causes a reduction in toughness. Therefore, the Cr content is limited to fall between 13 and 25 weight %.

Ni is remarkably effective in improving the stability of austenite and suppressing generation of $\sigma$ phase. The lower limit of the Ni content is selected to be 13 weight % for the reason that this is a sufficient amount for improving the stability of austenite with respect to the lower limits of ferrite-forming elements including Cr. On the other hand, the upper limit of the Ni content is selected to be 40 weight % with respect to the upper limits of the ferrite-forming elements. Preferably, the Ni content is in a range of 20–40%.

Mo and W permit high-temperature strength to be greatly increased through solid solution strengthening effect and precipitation of fine carbides of Mo and W, and hence are added for the purpose of coping with rises in temperature and pressure of steam in a boiler. Mo and W are, however, expensive and deteriorate oxidation resistance. Therefore, the upper limit of the amounts of these elements is selected to be 3 weight % in total, while the lower limit thereof is selected to be 0.5 weight % in total since a total content not smaller than 0.5 weight % brings about remarkable effect in improving the creep rupture strength. Preferably, the contents of Mo and W are 1.0–2.5% in total.

Ti, Nb and V are elements forming carbides and nitrides thereof. By finely precipitating carbides and nitrides, Ti, Nb and V greatly improve creep strength. If the amount of one or more of these elements is less than 0.05 weight % in total, there is no strengthening effect. On the other hand, a total content in excess of 0.5 weight % causes precipitates to agglomerate, showing a tendency for creep strength to become lower on the contrary. Therefore, the amount of one or more of Ti, Nb and V limited to fall between 0.05 and 0.5 weight % in total. In view of mechanical strength, the content of Ti, Nb and V are preferably 0.2–0.4% in total.

Boron exhibits a considerable effect in improvement of creep strength as a result of enhancing the intergranular strength. However, a B content less than 0.001 is hardly effective. On the other hand, a B content in excess of 0.01 weight % adversely affects hot workability of a crude tube for producing boiler tube products. Therefore, the B content is limited to fall between 0.001 and 0.01 weight %. Preferably, the B content is 0.003–0.007%.

Other objects and advantages of the invention will be explained hereinafter through the embodiments.

TABLE 1

| | C | Si | Mn | Cr | Ni | Mo | Nb | Ti | Amount of Melting |
|---|---|---|---|---|---|---|---|---|---|
| Outer Surface Layer | 0.06 wt % | 2.98 | 1.17 | 20.6 | 25.6 | 1.96 | 0.26 | 0.05 | 500 kg |
| Inner Part | 0.07 wt % | 0.61 | 1.06 | 18.5 | 25.6 | 1.91 | 0.26 | 0.05 | 1 ton |

An alloy for making the outer surface layer of a boiler tube and another alloy for making the inner part thereof, the chemical compositions of which alloys are shown in Table 1, were melted in each of two high frequency induction furnaces by 500 kg and 1 ton, respectively. Then, the molten alloys were cast in a centrifugal casting machine having a metallic mold of 312 millimeters in inner diameter and 2200 millimeters in length, that is, first the alloy for the outer surface layer was cast in the centrifugal casting machine to provide a tube having a thickness of about 30 millimeters, and subsequently another molten metal for the inner part of the boiler tube was cast onto the inner face of the first centrifugally cast tube to thereby obtain a composite crude tube having a thickness of about 88 mm. The crude tube were cut at both ends thereof to provide dimensions of 312 millimeters in outer diameter, 75 millimeters in inner diameter and 1900 millimeter in length. The crude tube was then forged by inserting therein a mandrel made of a mild steel having an outer diameter of 70 millimeters to thereby provide a bloom having an outer diameter of 180 mm, an inner diameter of 50 mm and a length of 5000 mm. This bloom was mechanically worked for grinding the outer surface thereof and for piercing the inner portion of the composite bloom, with the result that there was prepared a composite crude tube for hot extrusion having an outer diameter of 170 mm and an inner diameter of 68 mm. After heating this crude tube to a temperature of 1200° C., it was subjected to hot extrusion with a ratio of reduction of area of 10, then subsequently subjected to cold drawing with a rate of reduction of area of 5 to 20% and then subjected to solution treatment at 1200° C. for 5 minutes, with the result that there was obtained a boiler tube product having an outer diameter of 50.8 mm and an inner diameter of 7.8 mm, in which boiler tube the thickness of the outer surface layer is about 2 mm.

In Table 2 there are shown the chemical composition of each of boiler tubes Nos. A to Q produced in the manner described above, the thickness of the outer surface layer in which the content of silicon is enriched, and the results of creep test, high temperature corrosion test and impact test. The creep strength is evaluated under a condition of 700° C. and the stress of 12 kg weight/mm². In the high temperature corrosion test, the high temperature corrosion resistance is evaluated by the amount of resultant corrosion caused after immersing the test piece of a boiler tube into a molten salt of synthetic ash consisting of 41% $Na_2SO_4$, 8% $V_2O_5$ and 51% $Fe_2(SO_4)_3$. In the impact test, the impact value was evaluated by use of a test piece of JIS No. 4 after keeping the test piece of the boiler tube at 700° C. for 4000 hours.

In the Table 2, the boiler tubes Nos. D, E, F, K, L and N belong to the invention of the present invention not including boron, the boiler tubes Nos. P and Q belonging to the invention of the present invention which contains boron in the steel, and the rest are boiler tubes having chemical compositions which are not included in the scope of the present invention, being shown for comparison.

In Table 2, the boiler tube A is conventional one made of AISI 321 HTB steel alloy which is used as a super heater in a thermal-power generation boiler in Japan, while the boiler tube B is conventional one made of AISI 347 HTB employed for the same use as above in the U.S.A. Both of them are, however, unsatisfactory in creep rupture strength and high-temperature corrosion resistance in such a case that the surface temperature reaches 700° C. The boiler tube C has an Si content of the outer surface layer out of the lower limit thereof prescribed according to the component range of the invention. The Si amount of the outer surface layer less than 1.5 weight % cannot provide a satisfactory corrosion resistance. The boiler tube G has an Si amount out of the upper limit thereof prescribed according to the component range of the invention, and hence is large in deterioration of toughness after an aging for a long time (embrittlement during service). Although the boiler tubes H and I have Si contents of the outer surface layers close to the upper limit thereof according to the component range of the invention, the thicknesses of the outer surface layers thereof are out of the lower and upper limits thereof, respectively. The boiler tube H has an extremely large Si content, 3.95 weight %. The boiler tube H, however, has an Si-enriched layer excessively thin; hence, the corrosion resistance thereof is unsatisfactory. The boiler tube I has an Si-enriched layer excessively thick, resulting in a reduction in toughness as a whole, as well as causing a problem in the hot workability. The boiler tube J contains 2.54 weight % Si in both the outer surface layer and inner part thereof which exceeds both the upper limits of the Si contents. Although this boiler tube is satisfactorily excellent in corrosion resistance, the toughness and workability thereof are inferior. The boiler tubes M and O have amounts of Ti and Nb which are out of the lower limit and the upper limit of the amount of Ti and/or Nb according to the component range of the invention, respectively. It is impossible to obtain a satisfactory creep rupture strength when the amount of Ti and/or Nb is excessively large or small out of proper ranges shown in the invention.

On the other hand, the boiler tubes of the invention are much superior in both creep rupture strength and high-temperature corrosion resistance to the AISI 321 HTB and AISI 347 HTB conventionally employed. Moreover, the boiler tubes of the invention advantageously have no special problems in both embrittlement during the service thereof and hot workability.

Particularly, the boiler tubes P and Q belonging to the second embodiment of the invention have boron added thereto for the purpose of a further improvement in creep strength. The effect of boron is clear from the comparison of the boiler tubes P and Q with the boiler tubes E and N belonging to the first embodiment of the invention.

As has been described in detail, the invention provides excellent boiler tubes which are fit for use under a higher temperature than that regarding the conventional austenitic stainless steel boiler tubes.

TABLE 2

Chemical compositions of boiler tubes and values in various tests

| Steels | C | Si Inner part | Si Outer surface layer | Mn | Cr | Ni | Mo | W | Ti | Nb | V | B | Thickness of Si-enriched outer surface larger (mm) | Creep rupture time (h) 700° C., 12 kg/mm² | Corrosion amount (mg/cm²) 700° C., 200 h | Impact value (kg-m) 700° C., 4000 h |
|---|---|---|---|---|---|---|---|---|---|---|---|---|---|---|---|---|
| o A | 0.07 | 0.55 | 0.55 | 1.63 | 17.4 | 11.4 | — | — | 0.43 | — | — | — | 0 | 853 | 826 | 10.5 |
| o B | 0.06 | 0.49 | 0.49 | 1.79 | 17.6 | 12.0 | — | — | — | 0.73 | — | — | 0 | 1241 | 883 | 12.3 |
| o C | 0.06 | 0.43 | 1.30 | 1.52 | 22.2 | 30.2 | 1.48 | — | 0.11 | 0.20 | — | — | 2.8 | 2325 | 628 | 7.4 |
| D | 0.06 | 0.32 | 1.55 | 1.48 | 22.1 | 30.1 | 1.47 | — | 0.10 | 0.22 | 0.05 | — | 2.8 | 2450 | 396 | 6.8 |
| E | 0.06 | 0.54 | 2.54 | 1.51 | 22.1 | 30.4 | 1.20 | 0.35 | 0.10 | 0.20 | — | — | 1.5 | 2563 | 323 | 6.9 |
| F | 0.06 | 0.95 | 3.95 | 1.50 | 22.3 | 30.5 | 1.49 | — | 0.12 | 0.18 | — | — | 0.8 | 2386 | 247 | 6.5 |
| o G | 0.06 | 1.10 | 1.10 | 1.52 | 22.0 | 30.8 | 1.51 | — | 0.10 | 0.19 | 0.07 | — | 0 | 1856 | 643 | 3.7 |
| o H | 0.06 | 0.95 | 3.95 | 1.49 | 22.0 | 30.6 | 1.48 | — | 0.11 | 0.21 | — | — | 0.45 | 1921 | 462 | 5.9 |
| o I | 0.06 | 0.95 | 3.95 | 1.47 | 22.2 | 30.4 | 1.51 | — | 0.10 | 0.20 | — | — | 3.5 | 1963 | 152 | 2.5 |
| o J | 0.06 | 2.54 | 2.54 | 1.50 | 22.3 | 29.8 | 1.47 | — | 0.10 | 0.21 | — | — | 0 | 1672 | 268 | 1.3 |
| K | 0.10 | 0.51 | 2.54 | 1.47 | 18.1 | 20.2 | 1.29 | 0.21 | 0.08 | 0.20 | 0.03 | — | 1.5 | 3943 | 207 | 7.2 |
| L | 0.09 | 0.51 | 3.81 | 1.51 | 15.2 | 20.0 | 1.50 | — | 0.10 | 0.22 | — | — | 1.5 | 4516 | 176 | 5.7 |
| o M | 0.10 | 0.51 | 2.54 | 1.50 | 18.5 | 18.5 | 1.51 | — | 0.02 | 0.02 | — | — | 1.5 | 1347 | 219 | 7.5 |
| N | 0.10 | 0.51 | 2.54 | 1.50 | 18.3 | 18.9 | 1.50 | — | 0.20 | 0.20 | 0.05 | — | 1.5 | 4308 | 201 | 6.9 |
| o O | 0.09 | 0.51 | 2.54 | 1.43 | 18.3 | 17.9 | 14.9 | — | 0.35 | 0.30 | 0.10 | — | 1.5 | 1726 | 210 | 6.5 |
| P | 0.06 | 0.53 | 2.53 | 1.56 | 21.8 | 29.8 | 1.21 | 0.37 | 0.10 | 0.20 | — | 0.003 | 1.5 | 3146 | 339 | 7.0 |
| Q | 0.09 | 0.49 | 2.56 | 1.49 | 18.0 | 18.5 | 1.48 | — | 0.20 | 0.21 | 0.03 | 0.005 | 1.5 | 4925 | 208 | 7.2 | o: Steels for comparison

What is claimed is:

1. A boiler tube having improved high temperature strength, improved high temperature corrosion resistance, and resistivity to embrittlement during the service thereof, comprising an outer surface layer and an inner part, said outer surface layer consisting essentially, by weight, of 0.03–0.20% carbon, 1.8–4.0% silicon, 0.1–3.0% manganese, 13–25% chromium, 13–40% nickel, 1.0–2.5% at least one kind selected from the group consisting of molybdenum and tungsten, 0.05–0.5% at least one kind selected from the group consisting of titanium, niobium and vanadium, and the balance iron and incidental impurities, said inner part consisting essentially, by weight, of 0.03–0.20% carbon, 0.3–1.0% silicon, 0.1–3.0% manganese, 13–25% chromium, 13–40% nickel, 0.5–3.0% at least one kind selected from the group consisting of molybdenum and tungsten, 0.05–0.5% at least one kind selected from the group consisting of titanium, niobium and vanadium, and the balance iron and incidental impurities.

2. A boiler tube having improved high temperature strength, improved high temperature corrosion resistance, and resistance to embrittlement during the service thereof, comprising an outer surface layer and an inner part, said outer surface layer consisting essentially, by weight, of 0.03–0.20% carbon, 1.8–4.0% silicon, 0.1–3.0% manganese, 13–25% chromium, 13–40% nickel, 1.0–2.5% in total of at least one kind selected from the group consisting of molybdenum and tungsten, 0.05–0.5% in total of at least one kind selected from the group consisting of titanium, niobium and vanadium, 0.001–0.01% boron, and the balance iron and incidental impurities, said inner part consisting essentially, by weight, of 0.03–0.20% carbon, 0.3–1.0% silicon, 0.1–3.0% manganese, 13–25% chromium, 13–40% nickel, 0.5–3.0% in total of at least one kind selected from the group consisting of molybdenum and tungsten, 0.05–0.5% in total at least one kind selected from the group consisting of titanium, niobium and vanadium, 0.001–0.01% boron, and the balance iron and incidental impurities.

3. A boiler tube as claimed in claim 1 or 2, wherein the value of thickness of the outer surface layer is in a range of 0.5–3 millimeters.

4. A boiler tube as claimed in claim 1 or 2, wherein the amount of corrosion of the outer surface layer in contact with a combustion gas is in a range of 176–396 mg/cm$^2$ in a case where the outer surface layer is exposed to a high temperature corrosion environment of 700° C. in temperature for 200 hours.

5. A boiler tube as claimed in claim 1 or 2, wherein the creep rupture time thereof is in a range of 2386–4925 hours under a state of 700° C. and 12 kg/mm$^2$.

6. A boiler tube as claimed in claims 1 or 2, wherein the impact value thereof is in a range of 5.7–7.2 kg-meter after the lapse of 4000 hours at a temperature of 700° C.

7. The boiler tube of claim 1 wherein said outer surface layer consists essentially, by weight, of 0.05–0.15% carbon, 1.8–3.0% silicon, 0.3–1.5% manganese, 13–25% chromium, 20–40% nickel, 1–2.5% in total of at least one kind selected from the group consisting of molybdenum and tungsten, 0.2–0.4% in total of at least one kind selected from the group consisting of titanium, niobium and vanadium, and the balance iron and incidental impurities, and wherein said inner part consists essentially, by weight, of 0.05–0.15% carbon, 0.3–1.0% silicon, 0.3–1.5% manganese, 13–25% chromium, 20–40% nickel, 1–2.5% in total of at least one kind selected from the group consisting of molybedenum and tungsten, 0.2–0.4% in total of at least one kind selected from the group consisting of titanium, niobium and vanadium, and the balance iron and incidental impurities.

8. The boiler tube of claim 2 wherein the boron content of each of said outer surface layer and said inner part is 0.003–0.007% by weight.

9. The boiler tube of claim 2 wherein the silicon content of the outer surface layer is 1.8–3.0% by weight.

10. The boiler tube of claim 2 wherein the amount of corrosion of the outer surface layer in contact with a combustion gas is not larger than 400 mg/cm$^2$ in a case where the outer surface layer is exposed to a high temperature corrosion environment of 700° C. in temperature for 200 hours.

11. The boiler tube of claim 2 wherein said outer surface layer consists essentially, by weight, of 0.5–0.15% carbon, 1.8–3.0% silicon, 0.3–1.5% manganese, 13–25% chromium, 20–40% nickel, 1–2.5% in total of at least one kind selected from the group consisting of molybdenum and tungsten, 0.2–0.4% in total of at least one kind selected from the group consisting of titanium, niobium and vanadium, and the balance iron and incidental impurities, and, said inner part consists essentially, by weight, of 0.05–0.15% carbon, 0.3–2.0% silicon, 0.3–1.5% manganese, 13–25% chromium, 20–40% nickel, 1–2.5% in total of at least one kind selected from the group consisting of molybdenum and tungsten, 0.05–0.5% in total of at least one kind selected from the gorup consisting of titanium, niobium and vanadium, 0.003–0.007% boron, and the balance iron and incidental impurities.

12. The boiler tube of claim 1 wherein the silicon content of the outer surface layer is 1.8–3.0% by weight.

13. The boiler tube of claim 1 wherein the amount of corrosion of the outer surface layer in contact with a combustion gas is not larger than 400 mg/cm$^2$ in a case where the outer surface layer is exposed to a high temperature corrosion environment of 700° C. in temperature for 200 hours.

14. The boiler tube of claim 1 wherein the carbon content of each of said outer surface layer and said inner part is 0.05–0.15 weight percent.

15. The boiler tube of claim 2 wherein the carbon content of each of said outer surface layer and said inner part is 0.05–0.15 weight percent.

16. The boiler tube of claim 1 wherein the manganese content of each of said outer surface layer and said inner part is 0.3–1.5 weight percent.

* * * * *